United States Patent
Askin et al.

(10) Patent No.: US 12,157,530 B2
(45) Date of Patent: Dec. 3, 2024

(54) MICROMOBILITY TRANSIT VEHICLE LOCK-TO MECHANISM SYSTEMS AND METHODS

(71) Applicant: Lyft, Inc., San Francisco, CA (US)

(72) Inventors: Erik Keith Askin, San Francisco, CA (US); Jeffrey Alan Boyd, San Rafael, CA (US); Alex Dixon, San Francisco, CA (US); Garrett Korda Drayna, San Carlos, CA (US); Merric-Andrew Jaranowski French, San Francisco, CA (US); Daniel Lami Goldstein, San Francisco, CA (US); Rochus Emanuel Jacob, San Francisco, CA (US); Jared Mitchell Kole, San Jose, CA (US); Chen-Yu Lin, Santa Clara, CA (US); Oliver Maximilian Mueller, San Francisco, CA (US); James Jeng-Yeu Peng, San Francisco, CA (US); Andrew Michael Reimer, San Francisco, CA (US); Neil Richard Anthony Saldanha, San Francisco, CA (US); Gary Shambat, San Francisco, CA (US); Jennifer Uang, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 73 days.

(21) Appl. No.: 17/566,401

(22) Filed: Dec. 30, 2021

(65) Prior Publication Data

US 2022/0194503 A1 Jun. 23, 2022

Related U.S. Application Data

(63) Continuation of application No. 15/930,195, filed on May 12, 2020, now Pat. No. 11,214,322.

(51) Int. Cl.
*B62H 5/00* (2006.01)
*B60R 25/30* (2013.01)
(Continued)

(52) U.S. Cl.
CPC ........... *B62H 5/003* (2013.01); *B60R 25/305* (2013.01); *B62J 6/015* (2020.02); *B62J 6/02* (2013.01);
(Continued)

(58) Field of Classification Search
CPC . B62H 5/003; B62H 5/14; B62H 5/00; B62H 3/00; B62H 2003/005; B62J 6/015;
(Continued)

(56) References Cited

U.S. PATENT DOCUMENTS

| | | | | | |
|---|---|---|---|---|---|
| 4,920,334 A | * | 4/1990 | DeVolpi | ................... | B62H 3/04 340/568.4 |
| 5,197,310 A | * | 3/1993 | Pedersen | ................ | B62H 5/147 70/227 |

(Continued)

OTHER PUBLICATIONS

EnergyBus purpose a single charging station for all LEV vehicles, available at https://www.electricmotornews.com/gb/veicoli-ecologici/energybus-stazione-ricarica-veicoli-elettrici-leggeri/, 9 pages, Jun. 22, 2020.

(Continued)

*Primary Examiner* — Kevin Hurley
*Assistant Examiner* — Michael R Stabley
(74) *Attorney, Agent, or Firm* — Baker Botts L.L.P.

(57) ABSTRACT

Techniques are disclosed for systems and methods associated with locking a micromobility transit vehicle to a stationary object. A multimodal transportation system may include a docking station including a securement point, and a micromobility transit vehicle securable to the securement point of the docking station. The micromobility transit (Continued)

vehicle may include a storage basket and a lock cable including a first end coupled to the storage basket and a second end. The second end of the lock cable may be securable to the securement point of the docking station to lock the micromobility transit vehicle to the docking station. The storage basket may include a pin lock. The pin lock may engage a locking pin of the lock cable to lock the micromobility transit vehicle via the lock cable.

20 Claims, 18 Drawing Sheets

(51) Int. Cl.
B62J 6/015 (2020.01)
B62J 6/02 (2020.01)
B62J 7/06 (2006.01)
B62J 45/00 (2020.01)
E05B 71/00 (2006.01)
B62H 5/14 (2006.01)

(52) U.S. Cl.
CPC ................ B62J 7/06 (2013.01); B62J 45/00 (2020.02); E05B 71/00 (2013.01); B62H 5/14 (2013.01)

(58) Field of Classification Search
CPC ...... B62J 45/00; B62J 6/02; B62J 7/06; F05B 71/00; F05B 67/003; B60R 25/305
See application file for complete search history.

(56) References Cited

U.S. PATENT DOCUMENTS

| | | | | |
|---|---|---|---|---|
| 7,898,439 | B2* | 3/2011 | Bettez | G07F 9/001 340/432 |
| 8,065,895 | B2* | 11/2011 | Andersen | G07F 7/08 340/427 |
| 9,013,301 | B2* | 4/2015 | Williams | B62H 5/003 340/568.1 |
| 9,068,374 | B2* | 6/2015 | Jayadevappa | B62H 3/00 |
| 9,227,680 | B2* | 1/2016 | Kritzer | E05B 71/00 |
| 9,830,759 | B2* | 11/2017 | Hilton | E05B 47/0012 |
| 2007/0220933 | A1* | 9/2007 | Gagosz | B62M 6/40 70/233 |
| 2008/0034820 | A1* | 2/2008 | Gagosz | B62M 6/40 70/235 |
| 2008/0297108 | A1* | 12/2008 | Le Gars | B62H 3/00 320/109 |
| 2009/0031766 | A1* | 2/2009 | Stobbe | B62H 5/003 70/263 |
| 2009/0201127 | A1* | 8/2009 | Stobbe | B62H 3/04 340/5.6 |
| 2009/0266673 | A1* | 10/2009 | Dallaire | G07F 17/10 70/262 |
| 2010/0228405 | A1* | 9/2010 | Morgal | B62H 3/00 701/1 |
| 2011/0148346 | A1* | 6/2011 | Gagosz | B60L 50/20 320/135 |
| 2013/0255336 | A1* | 10/2013 | Desai | B62H 3/04 70/431 |
| 2014/0000322 | A1* | 1/2014 | Williams | B62H 5/003 70/18 |
| 2015/0074004 | A1* | 3/2015 | Song | G07C 9/00896 705/307 |
| 2016/0311334 | A1* | 10/2016 | Moravick | B60L 58/12 |
| 2017/0036722 | A1* | 2/2017 | Assénat | B62H 3/00 |
| 2018/0370594 | A1* | 12/2018 | Foley | B62M 6/65 |
| 2019/0047646 | A1* | 2/2019 | Mohamed | H04W 12/06 |
| 2019/0127002 | A1* | 5/2019 | Bettez | E05B 47/0001 |
| 2019/0152549 | A1* | 5/2019 | Wu | E05B 47/0001 |
| 2019/0344850 | A1* | 11/2019 | Sawhill | B62H 3/04 |

OTHER PUBLICATIONS

EnergyBus defines the key interfaces, within the vehicle, and to the charging infrastructure, available at https://energybus.org/components-leys, accessed on Apr. 1, 2022, 4 pages.

* cited by examiner

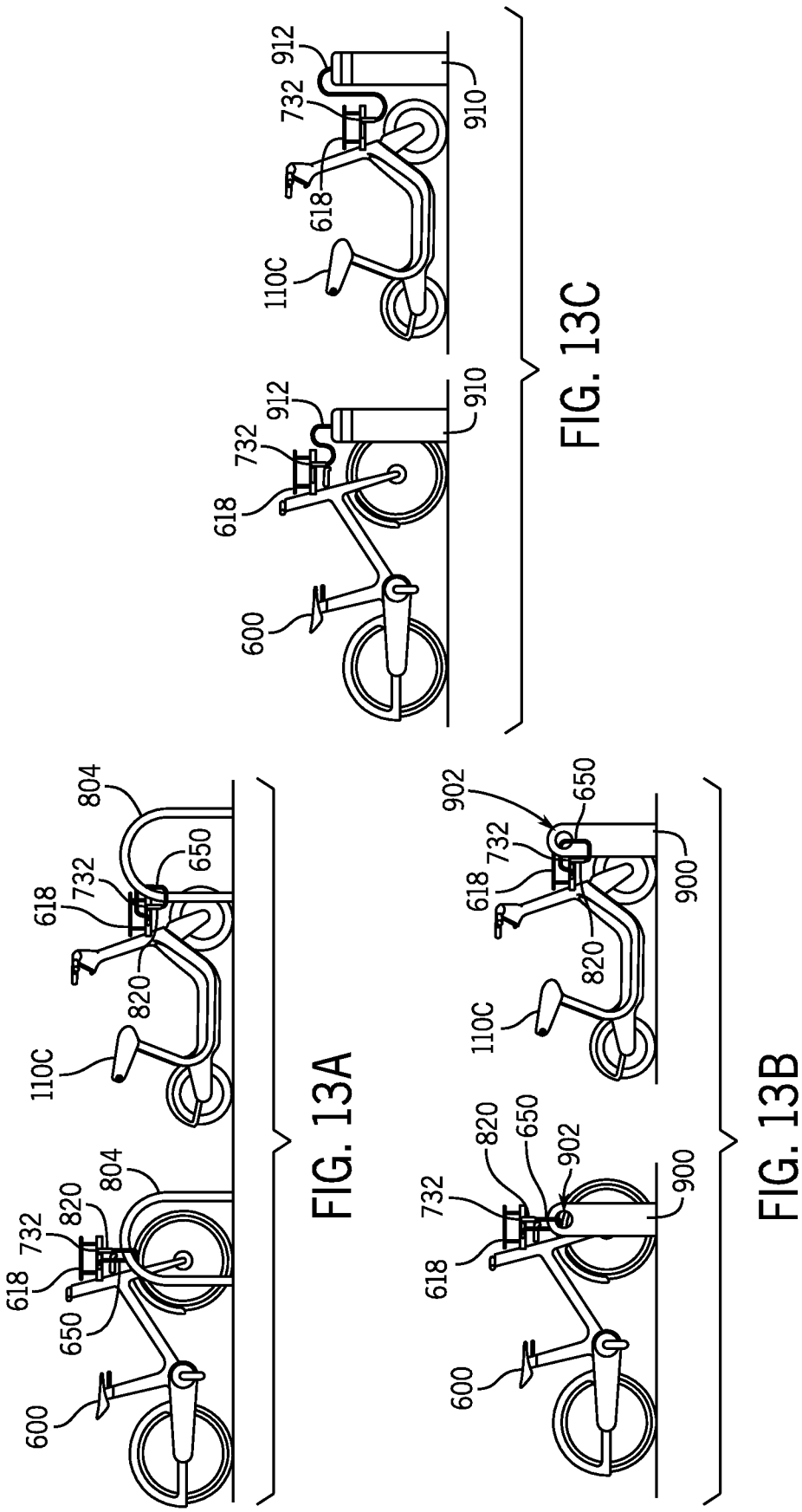

MICROMOBILITY TRANSIT VEHICLE LOCK-TO MECHANISM SYSTEMS AND METHODS

PRIORITY

This application is a continuation under 35 U.S.C. § 120 of U.S. patent application No. 15/930,195, filed 12 May 2020, which is incorporated herein by reference.

TECHNICAL FIELD

One or more embodiments of the present disclosure relate generally to micromobility transit vehicles and more particularly, for example, to systems and methods for locking a micromobility transit vehicle to a stationary object, such as to a docking station or to street furniture, via a lock-to mechanism integrated, at least partially, with a storage basket of the micromobility transit vehicle.

BACKGROUND

Docking stations for micromobility vehicles for hire (e.g., shared scooters, sit-scooters, bicycles, etc.) are robust and represent a significant investment for a ridesharing company. The docking stations may include structures or systems that permit a micromobility vehicle to be locked to the docking station, such as via interfacing structures between the docking station and the micromobility vehicle. New docking station designs may not interface with legacy docking structures of micromobility vehicles, or new micromobility vehicle designs may not interface with legacy docking stations. Legacy docking structures of micromobility vehicles may also not permit the micromobility vehicle to be locked to other structures or street furniture (i.e., a stationary or moveable structure located on a street, sidewalk, lot, park, or other area accessible by a rider of the micromobility vehicle, such as a bike rack, stationary pole, etc.) without the use of a separate locking device.

Therefore, there is a need in the art for systems and methods for a lock-to mechanism of a micromobility vehicle that addresses the deficiencies noted above, other deficiencies known in the industry, or at least offers an alternative to current techniques. For example, improvements are needed to lock a micromobility vehicle to a wide range of docking stations and street furniture using the same lock-to mechanism.

SUMMARY

Techniques are disclosed for systems and methods associated with a lock-to mechanism of a micromobility transit vehicle. In accordance with one or more embodiments, a multimodal transportation system is provided. The multimodal transportation system may include a docking station including a securement point and a micromobility transit vehicle securable to the docking station. The micromobility transit vehicle may include a storage basket and a lock cable including a first end coupled to the storage basket and a second end. The second end of the lock cable may be securable to the securement point of the docking station to lock the micromobility transit vehicle to the docking station.

In accordance with one or more embodiments, a micromobility transit vehicle is provided. The micromobility transit vehicle may include a storage basket including a pin lock, and a lock cable including a first end coupled to the storage basket and a second end including a locking pin. The locking pin may be securable to the pin lock of the storage basket to lock the micromobility transit vehicle via the lock cable.

In accordance with one or more embodiments, a storage basket for a micromobility transit vehicle is provided. The storage basket may include a lock cable including a first end fixed to the storage basket and a second end. The storage basket may include a pin lock configured to secure the second end of the lock cable to the storage basket.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 13A, 13B, and 13C illustrate respective diagrams of various use case examples of the locking assembly in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, a micromobility transit vehicle (e.g., a kick scooter, a sit-scooter, a bicycle, etc.) may include a storage basket with a lock structure configured to lock the micromobility transit vehicle to a stationary object, such as to a docking station, street furniture, or the like. The storage basket may include a lock cable including a first end fixed to the storage basket and second free end. The storage basket may include a lock-to mechanism configured to secure the second end of the lock cable to the storage basket, such as via engagement of a pin lock with a locking pin of the second end. The lock cable may be wrapped at least partially around a pole, bicycle rack, or other street furniture and the second end secured to the pin lock to lock the micromobility transit vehicle via the lock cable. The second end of the lock cable may be securable to a securement point of a docking station to lock the micromobility transit vehicle to the docking station.

Figure 1:
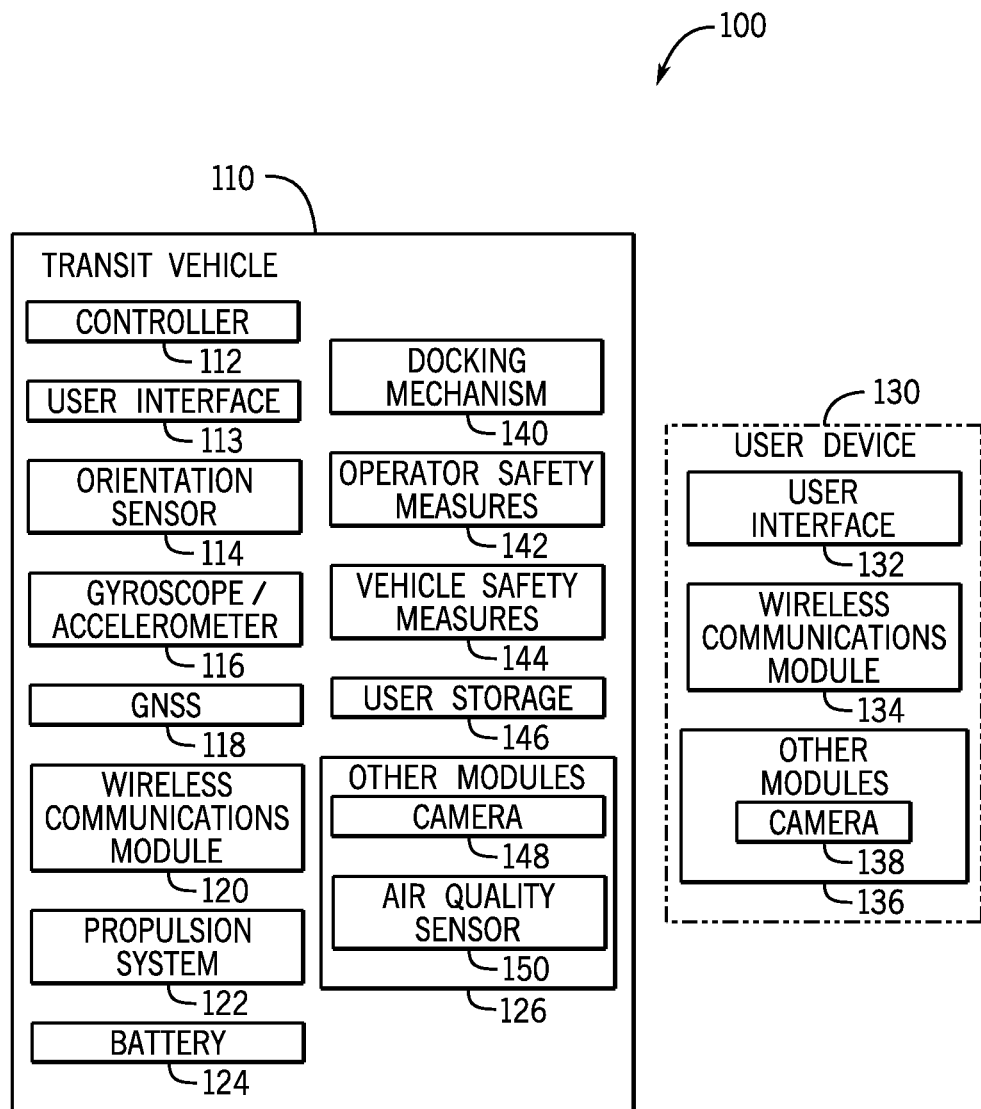
FIG. 1 illustrates a block diagram of a portion of a dynamic transportation matching system including a transit vehicle in accordance with an embodiment of the disclosure.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100, such as a transportation requester or rider.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a transportation requester or rider via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a transportation requester or rider and/or used by other devices of system 100 (e.g., controller 112) to provide operational control of transit vehicle 110 and/or system 100. In further embodiments, other modules 126 may include a light, such as a head light or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and rider and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user, such as a transportation requester or rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a transportation requester or rider and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
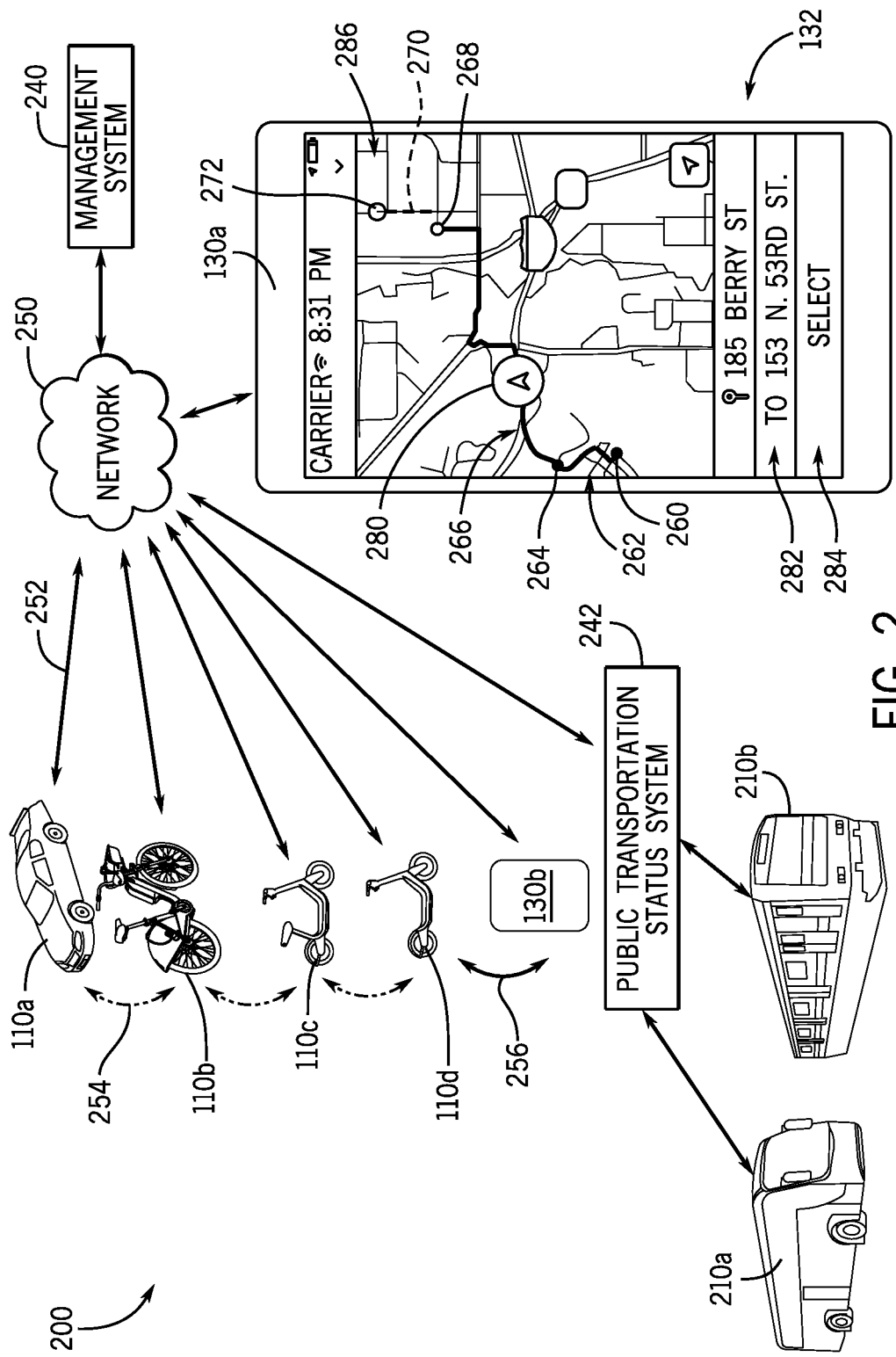
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a transportation requester or rider attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a transportation requester or rider to input a desired navigation destination), and a notice window 284 (e.g., used to render vehicle status data or other information, including user notices and/or alerts, as described herein). For example, a transportation requester or rider may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a transportation requester or rider (e.g., initially and/or while traversing a particular planned route), and a transportation requester or rider may select or make changes to such a route through manipulation of user device 130a, as shown. For example, management system 240 may be configured to suggest a quickest route, a least expensive route, a most convenient route (to minimize modality changes or physical actions a transportation requester or rider must take along the route), an inclement weather route (e.g., that keeps the transportation requester or rider protected from inclement weather a maximum amount of time during route traversal), or some combination of those that is determined as best suited to the transportation requester or rider, such as based on various user preferences. Such preferences may be based on prior use of system 200, prior user trips, a desired arrival time and/or departure time (e.g., based on user input or obtained through a user calendar or other data source), or specifically input or set by a user (e.g., a transportation requester or rider) for the specific route, for example, or in general. In one example, origination point 260 may be extremely congested or otherwise hard to access by a ride-share transit vehicle, which could prevent or significantly increase a wait time for the transportation requester or rider and a total trip time to arrive at destination 272. In such circumstances, a planned multimodal route may include directing the transportation requester or rider to walk and/or take a scooter/bike to an intermediate and less congested location to meet a reserved ride-share vehicle, which would allow the transportation requester or rider to arrive at destination 272 quicker than if the ride-share vehicle was forced to meet the transportation requester or rider at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
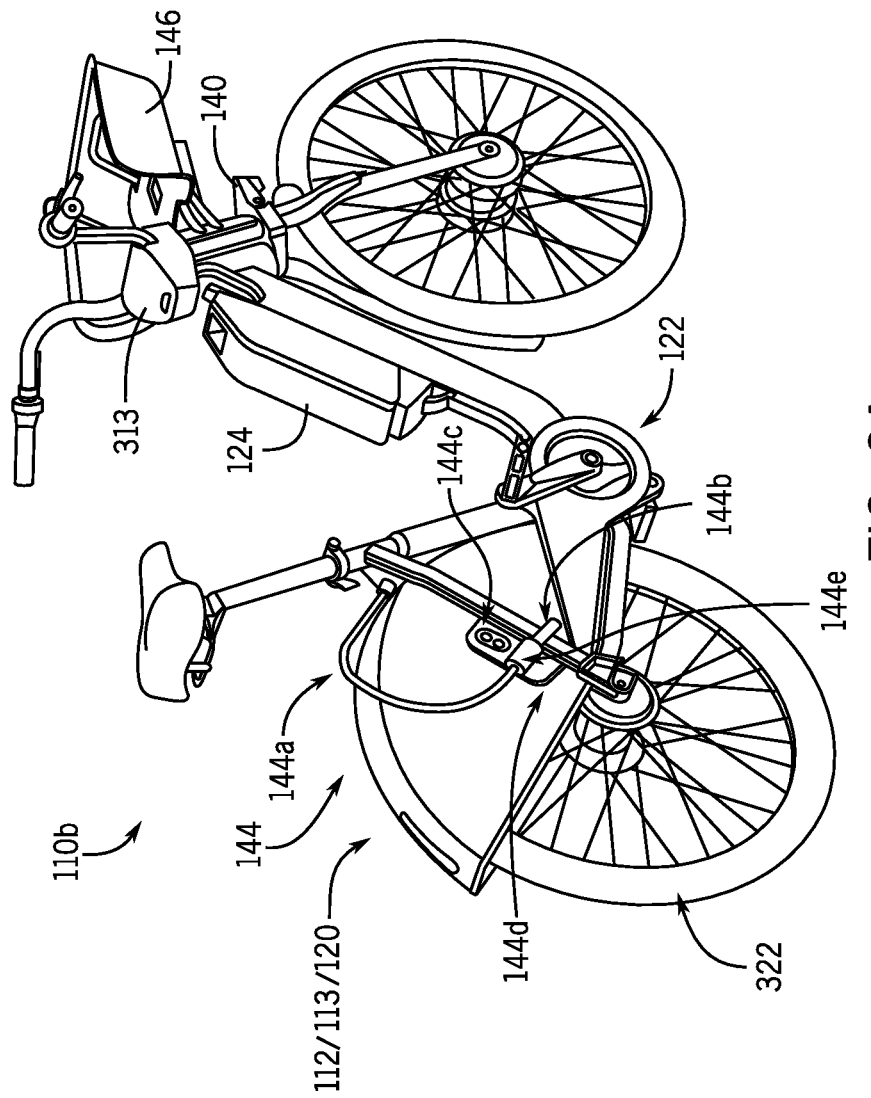
FIGS. 3A, 3B, and 3C illustrate respective diagrams of micromobility transit vehicles for use in a dynamic transportation matching system in accordance with an embodiment of the disclosure.
Figure 3B:
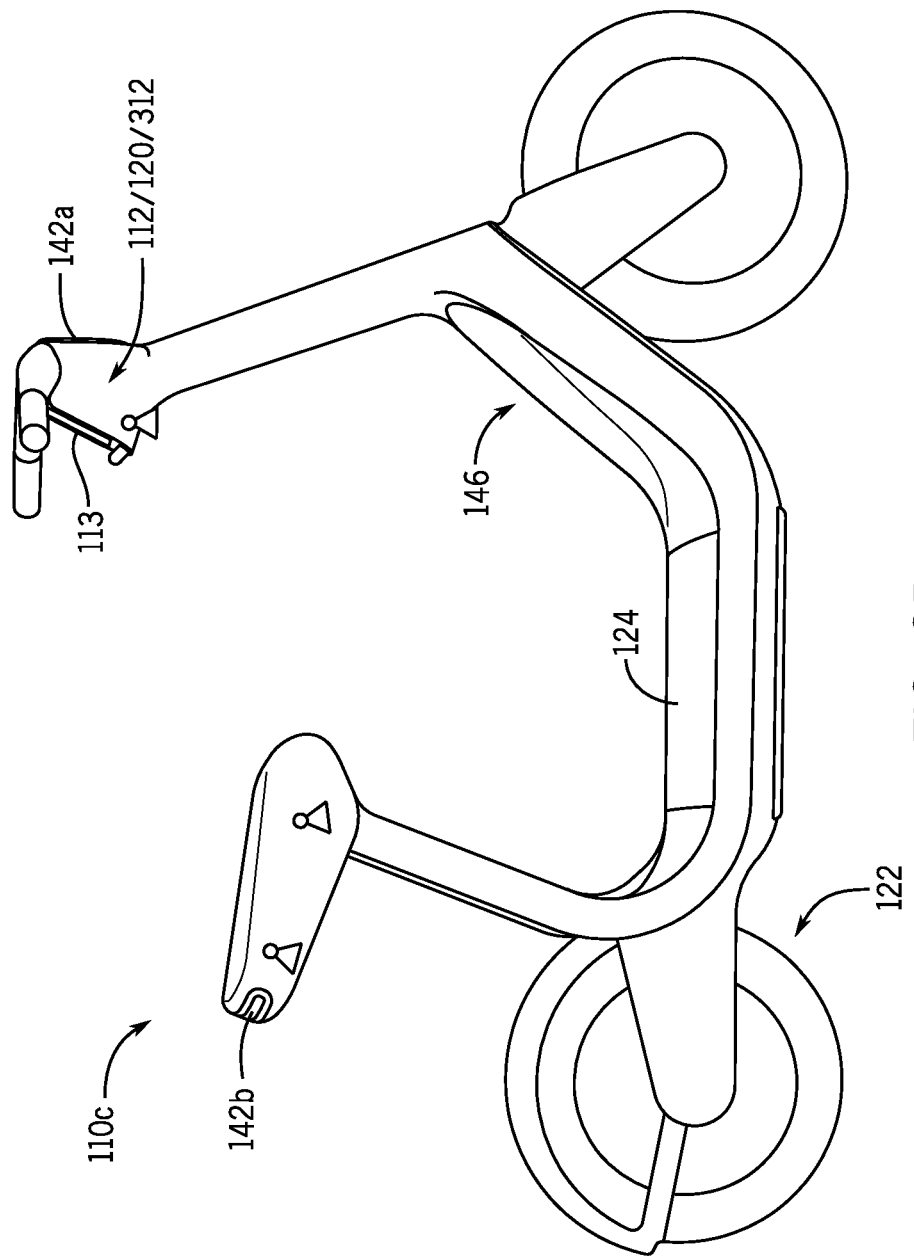
Figure 3C:
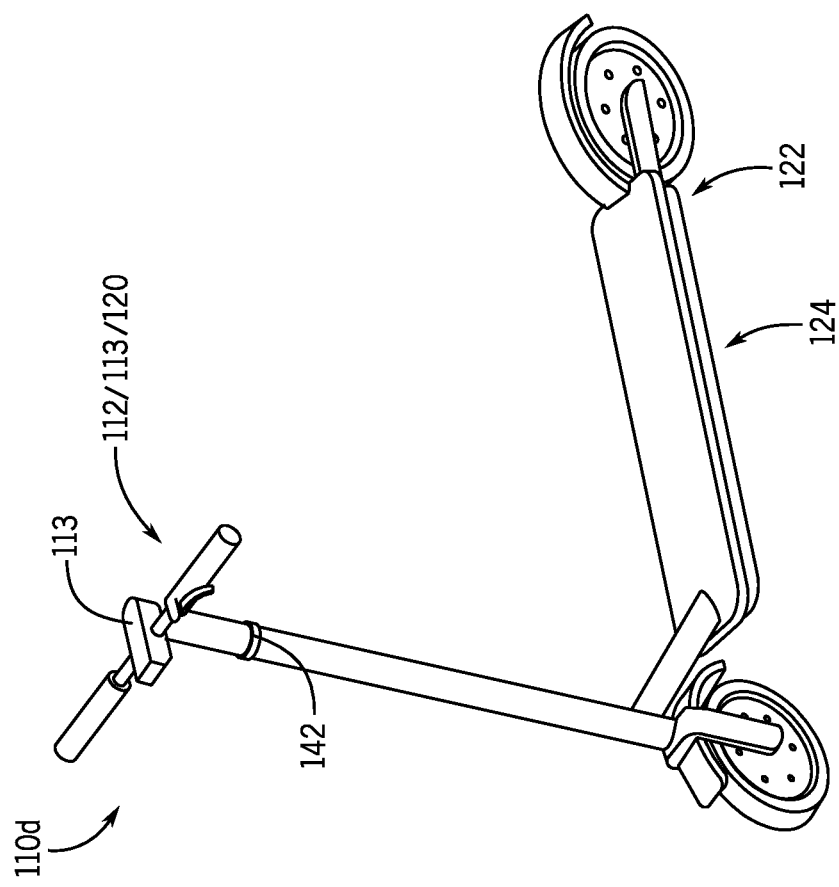

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a transportation requester or rider to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of head lights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
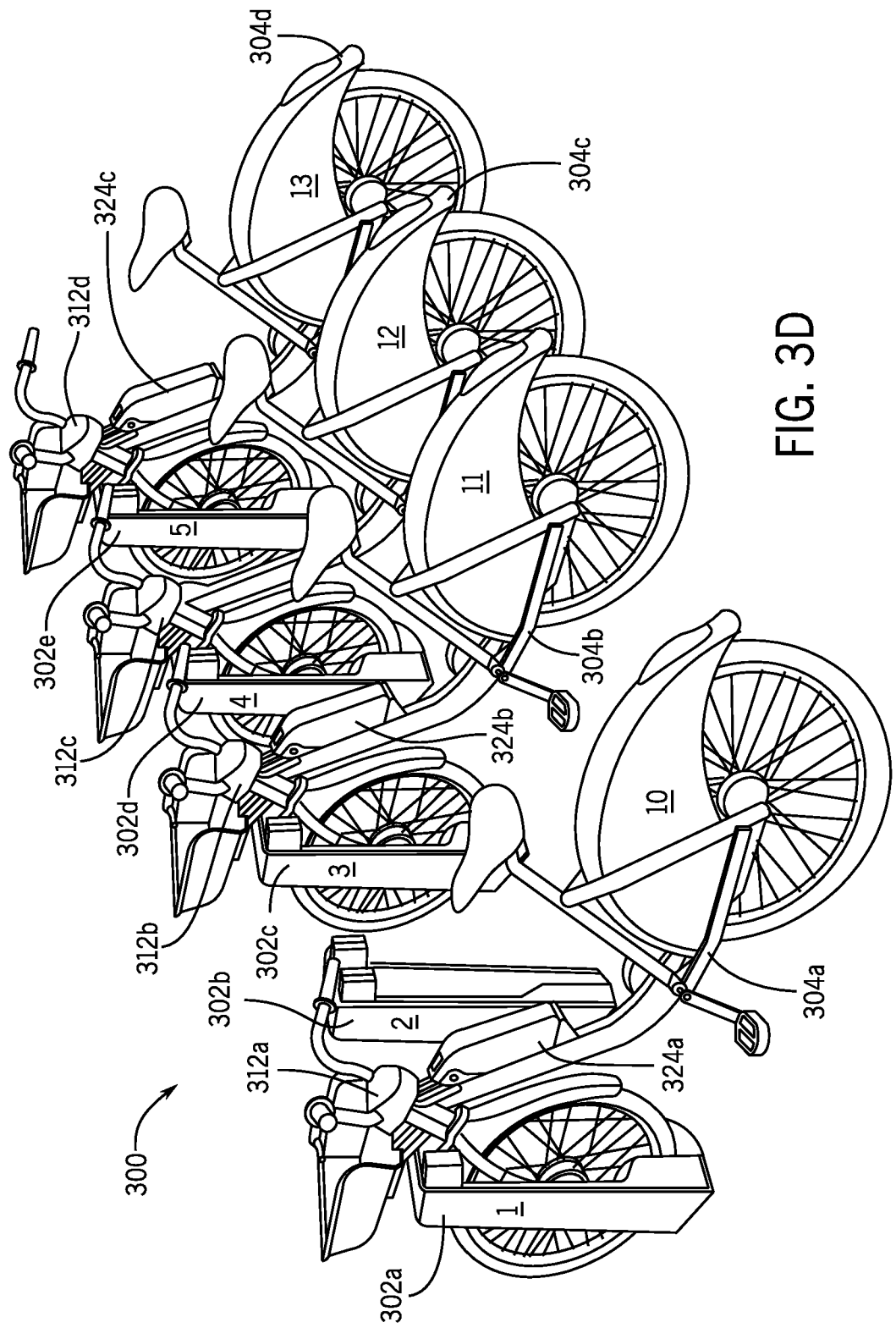
FIG. 3D illustrates a diagram of a docking station for docking one or more micromobility transit vehicles in accordance with an embodiment of the disclosure.

FIG. 3D illustrates a docking station 300 for docking transit vehicles (e.g., transit vehicles 110b, 110c, and 110d, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A transportation requester or rider may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
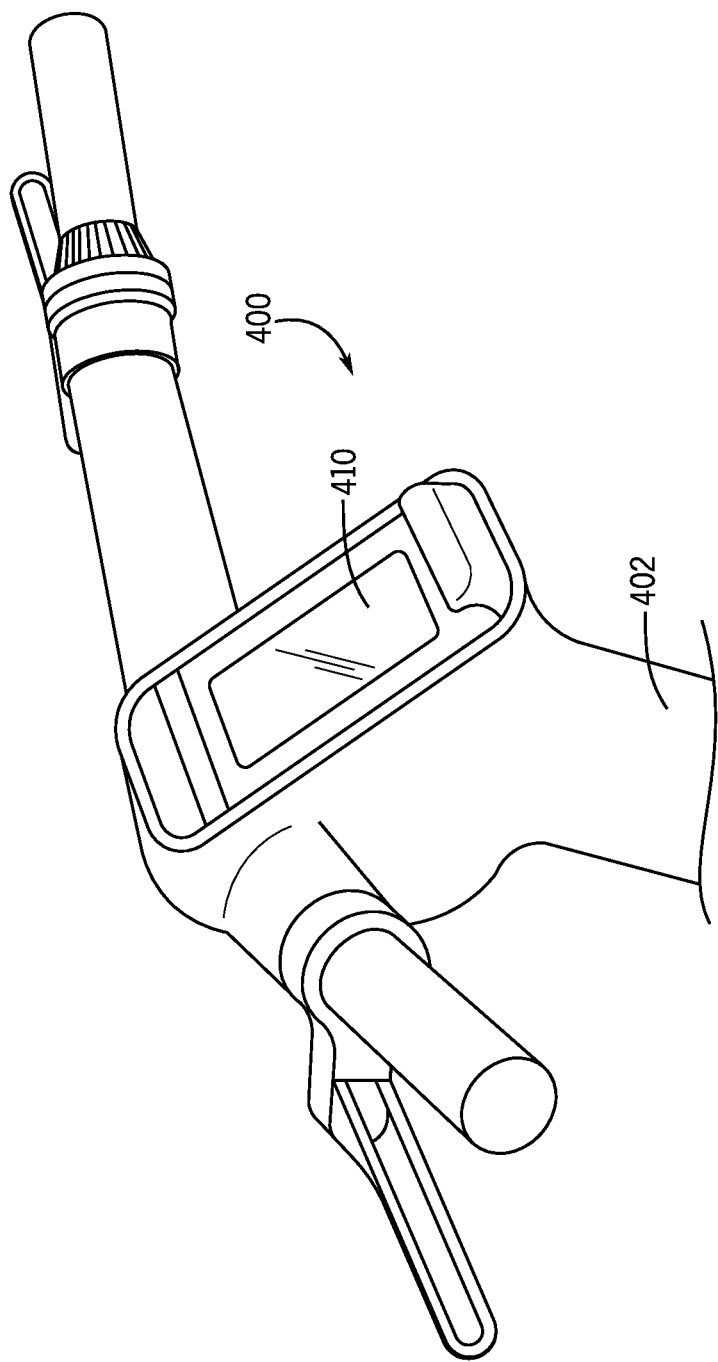
FIG. 4 illustrates a diagram of a user interface associated with a micromobility transit vehicle in accordance with an embodiment of the disclosure.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the rider during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the rider to properly lock and/or park the micromobility transit vehicle 402. In some embodiments, the user interface 400 may present information similar to that described in U.S. patent application Ser. No. 16/578,995, entitled "MICROMOBILITY ELECTRIC VEHICLE WITH ELECTRONIC DEVICE HOLDER AND INTEGRATED DISPLAY," which is incorporated herein in its entirety for all purposes.

Figure 5A:
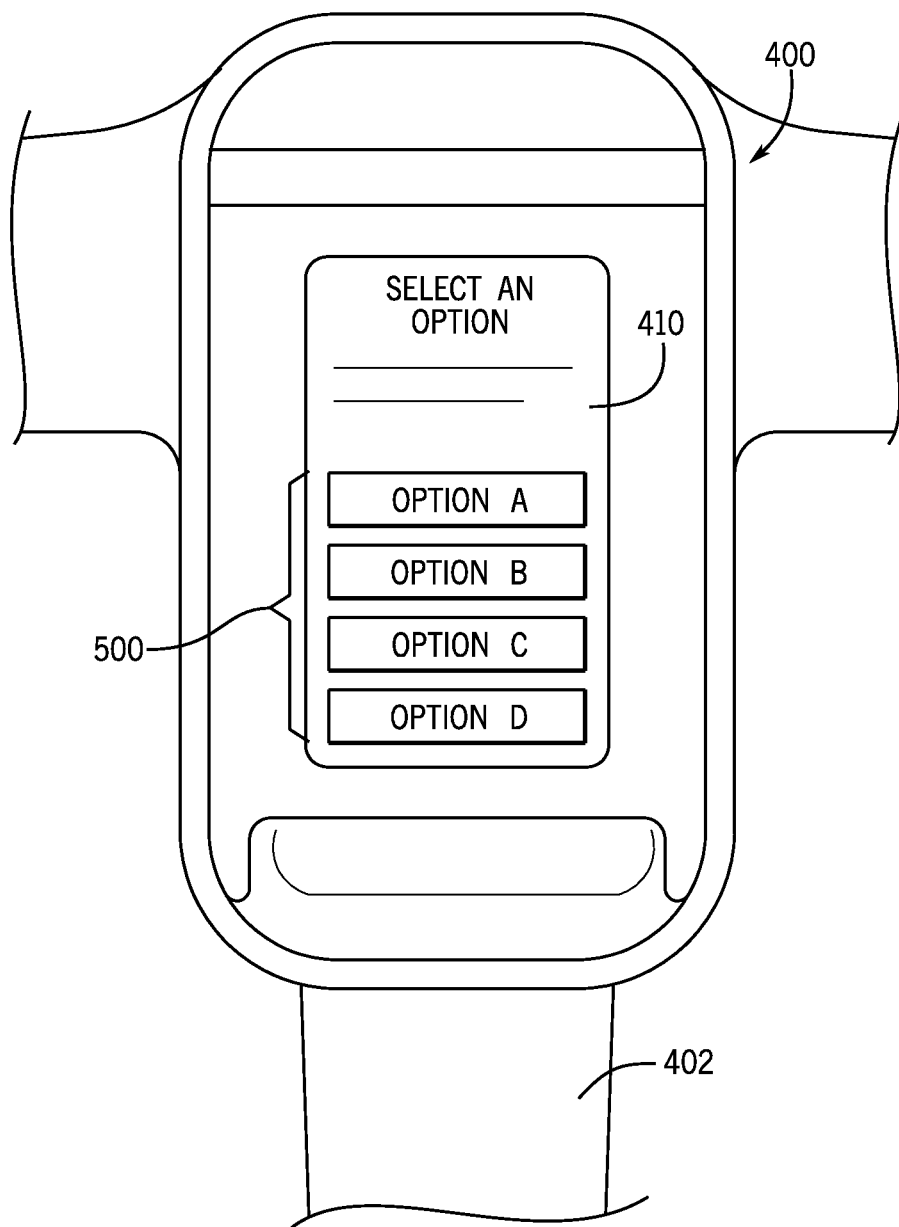
FIGS. 5A, 5B, and 5C illustrate respective diagrams of various examples of information rendered on a display of the user interface of FIG. 4 in accordance with an embodiment of the disclosure.
Figure 5B:
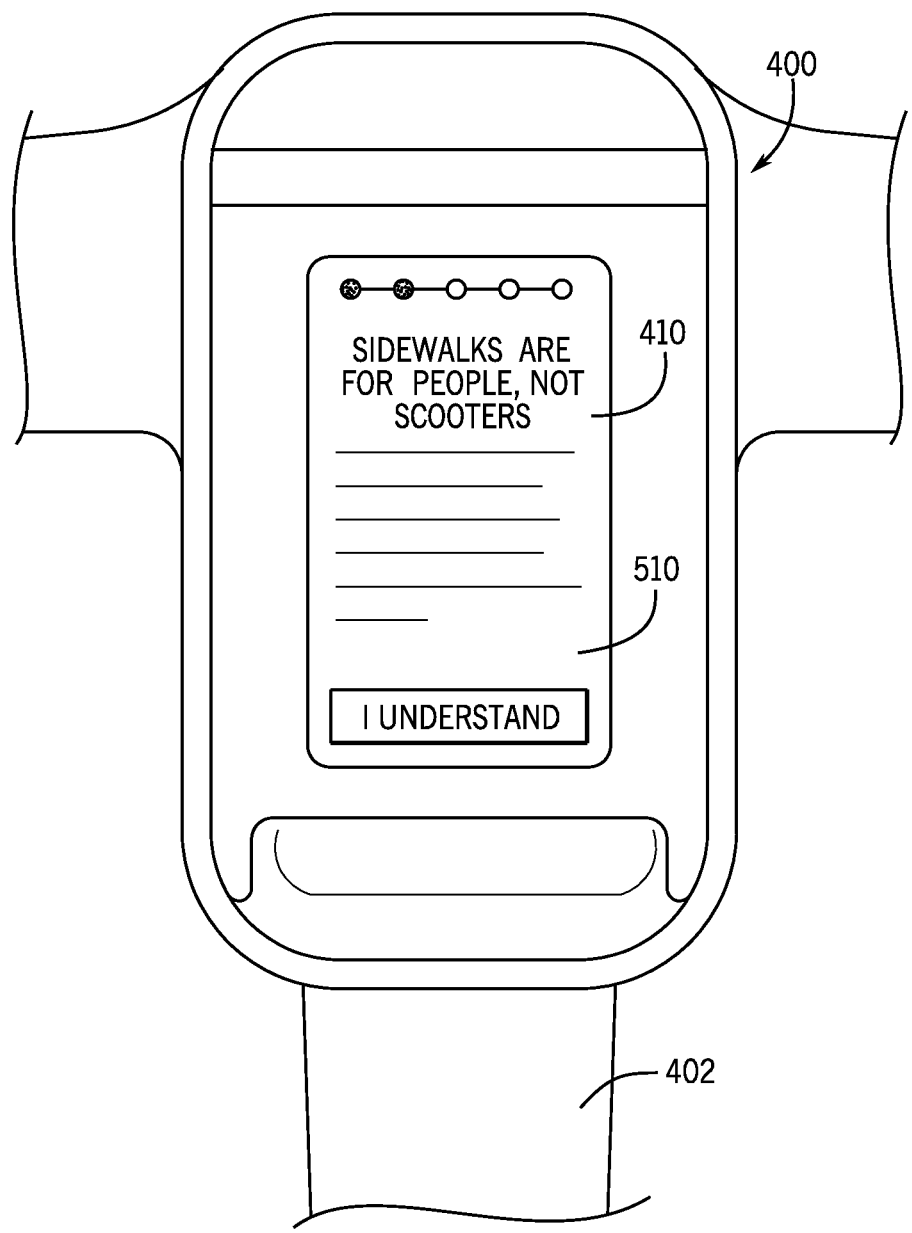
Figure 5C:
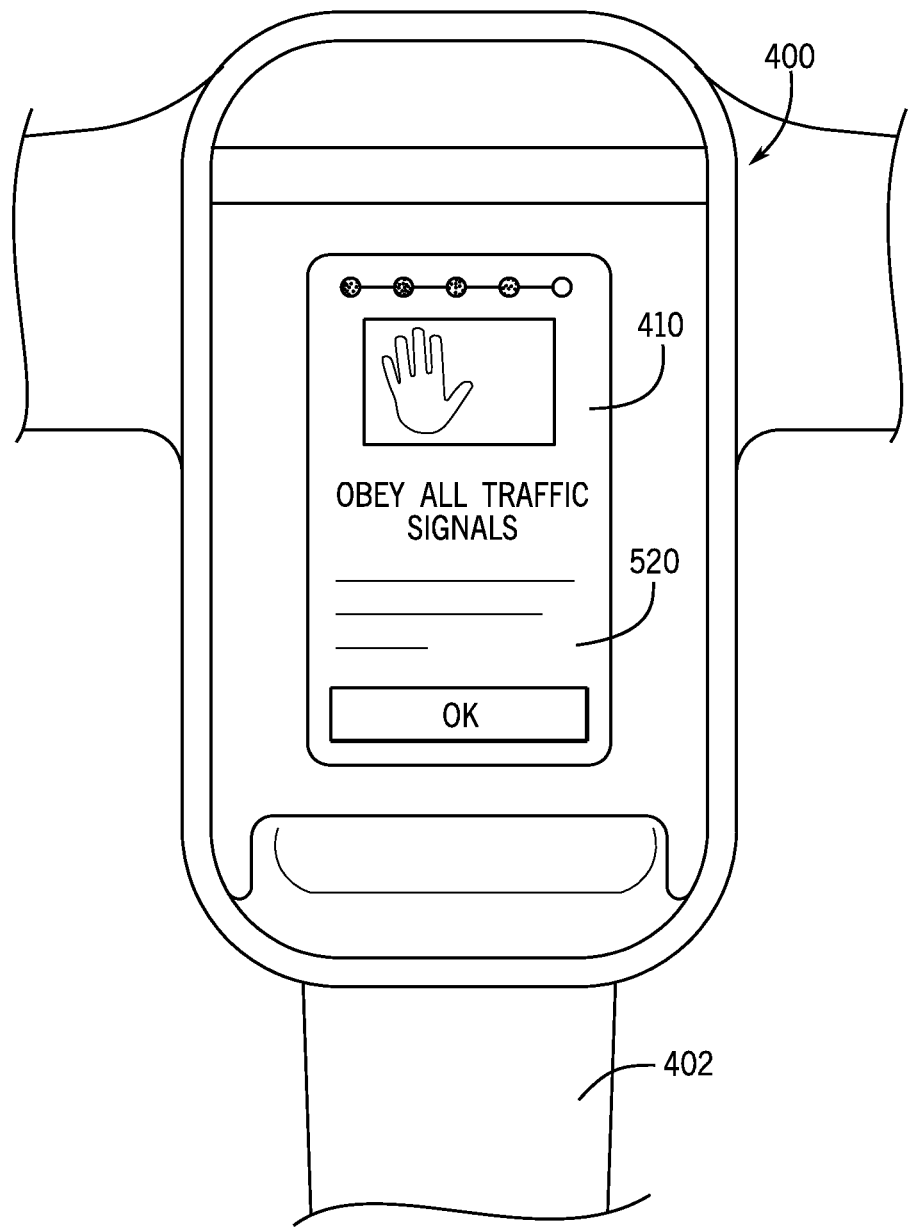

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a transportation requester or rider to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the rider to turn on a head light assembly, turn off the head light assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the rider before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 6:
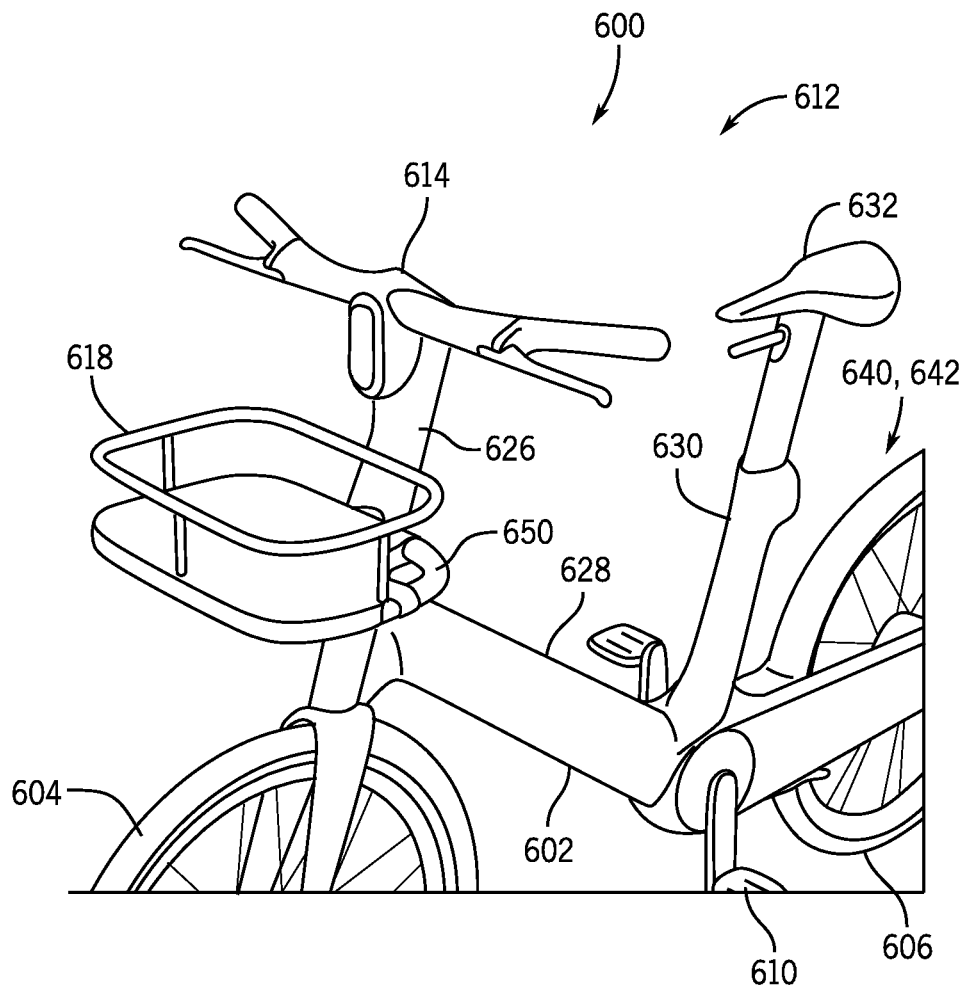
FIG. 6 illustrates a diagram of a micromobility transit vehicle in accordance with an embodiment of the disclosure.

FIG. 6 illustrates a diagram of a micromobility transit vehicle 600 in accordance with an embodiment of the disclosure. In the illustrated embodiment, the micromobility transit vehicle 600 is a bicycle, although other configurations are contemplated, including kick scooters, sit-scooters, and the like. As shown, the micromobility transit vehicle 600 includes a frame 602, a front wheel 604 coupled to the frame 602 (e.g., via a fork), a rear wheel 606 coupled to the frame 602 (e.g., via rear chain stays, a rear fork, a rear triangle, etc.), a propulsion system 610, a battery 612, a cockpit assembly 614, and a storage basket 618. In some embodiments, the micromobility transit vehicle 600 may be similar to any of the micromobility transit vehicles 110, 110*b*, 110*c*, or 110*d*, described above. Thus, any description above of like features is incorporated herein for micromobility transit vehicle 600.

The frame 602 may include many configurations. For example, the frame 602 may include a head tube 626, a down tube 628, and a seat tube 630 supporting a seat 632. In some embodiments, the frame 602 may include a top tube, though such is not required, as illustrated in FIG. 6. Thus, the frame 602 may include any number of frame members coupled together to form a support structure for the various components of the micromobility transit vehicle 600.

The propulsion system 610 may be any system or device operable to provide a motive force to at least one wheel of the micromobility transit vehicle 600 (e.g., the rear wheel 606) to propel the micromobility transit vehicle 600 across a surface (e.g., a road surface, a sidewalk, a path, a trail, etc.). The propulsion system 610 may be similar to the propulsion system 122 described above, such as including an electric motor 640 coupled to the at least one wheel and a motor controller 642 electronically coupled to the electric motor 640 to control a motive force provided by the electric motor 640 to the at least one wheel. Such embodiments are illustrative only, and the propulsion system 610 may include other features, such as a brake resistor electronically coupled to the motor controller 642 to produce a braking torque or dynamic braking on the electric motor 640 through electrical resistance, thereby decelerating the electric motor 640 as desired. In some embodiments, at least some portions of the propulsion system 610 may be housed within the frame 602, such as the motor and motor controller 642 housed or concealed by the rear chain stays. As described herein, "electronically coupling" or "electronically coupled" means electrically coupled together (e.g., for power coupling), communicatively coupled together (e.g., for sensor data communication), or both electrically coupled and communicatively coupled together.

The cockpit assembly 614 may provide a functional, intuitive, and distinctive cockpit or user interface for the rider when riding the micromobility transit vehicle 600. For example, the cockpit assembly 614 may be implemented with several interfaces, components, or features allowing the rider to see, verify, or control one or more operations of the micromobility transit vehicle 600. The cockpit assembly 614 may form at least part of an outer housing for the micromobility transit vehicle's handlebars. In some embodiments, the cockpit assembly 614 may include user interface 400 described above. In some embodiments, the cockpit assembly 614 may be similar to the cockpit assembly disclosed in U.S. patent application Ser. No. 16/729,070, entitled "MICRO-MOBILITY FLEET VEHICLE COCKPIT ASSEMBLY SYSTEMS AND METHODS," which is incorporated herein in its entirety for all purposes.

The storage basket 618 may be coupled to the frame 602, such as to the head tube 626, and may provide one or more functional benefits. For instance, the storage basket 618 may be configured to store a rider's belongings during a ride. In some examples, and as more fully explained below, the storage basket 618 may be configured to provide a locking function. For example, the micromobility transit vehicle 600 may be locked or otherwise secured to a docking station or other stationary object via one or more components of the storage basket 618. In some embodiments, the storage basket 618 may include a lock cable 650.

Figures 7A, 7B:
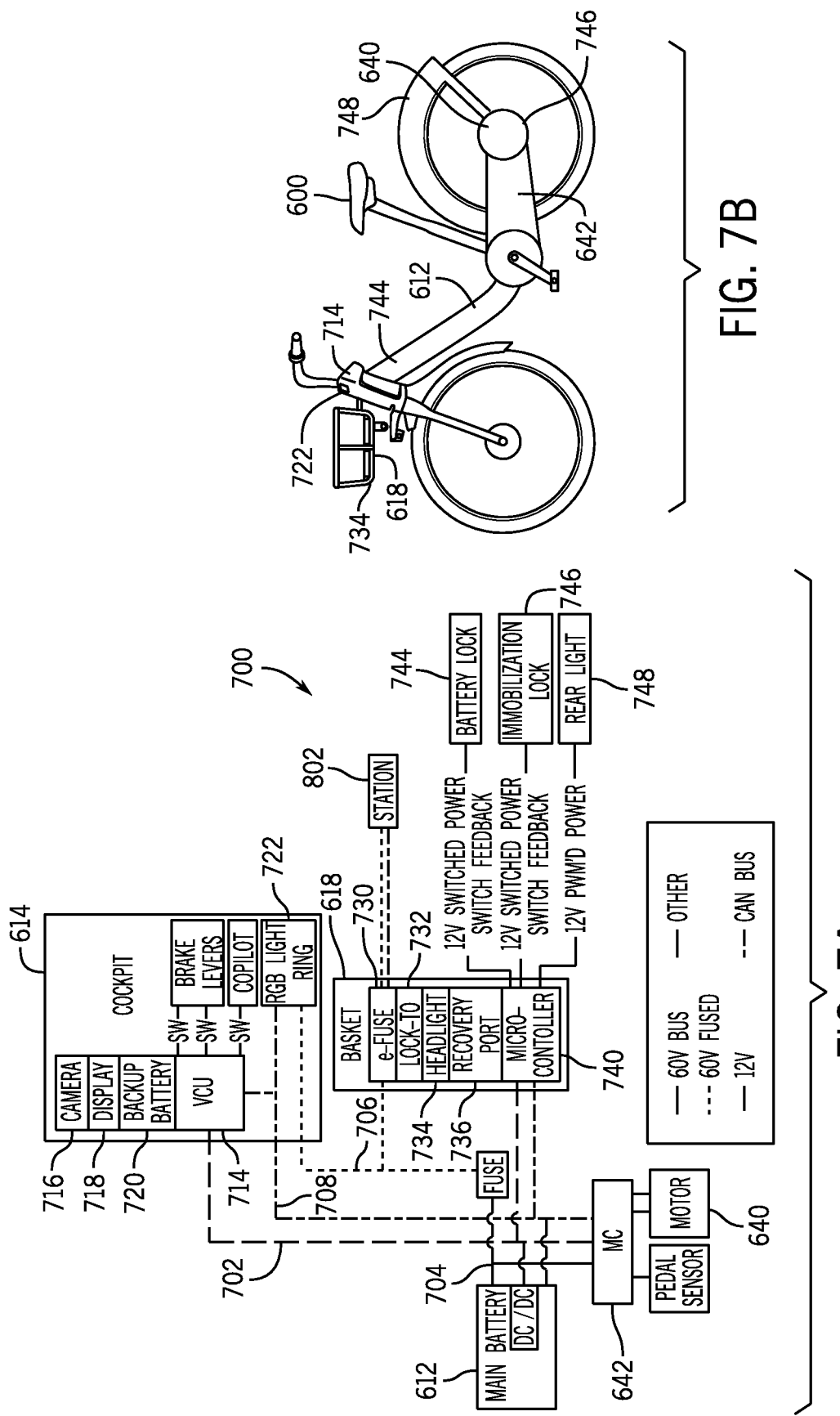
FIG. 7A illustrates a block diagram of an electrical architecture of a micromobility transit vehicle in accordance with an embodiment of the disclosure.
FIG. 7B illustrates a block diagram of a micromobility transit vehicle and showing the components of the electrical architecture of FIG. 7A on the micromobility transit vehicle in accordance with an embodiment of the disclosure.

FIG. 7A illustrates a block diagram of an electrical architecture 700 of the micromobility transit vehicle 600 in accordance with an embodiment of the disclosure. FIG. 7B illustrates a block diagram of the micromobility transit vehicle 600 and showing the components of the electrical architecture 700 on the micromobility transit vehicle 600 in accordance with an embodiment of the disclosure. Although the electrical architecture 700 is described with reference to micromobility transit vehicle 600, the electrical architecture 700 may be associated with any of transit vehicles 110, 110*b*, 110*c*, or 110*d*, described above.

As shown, the electrical architecture 700 includes the electric motor 640, motor controller 642, battery 612, storage basket 618, and cockpit assembly 614. In some embodiments, the electrical architecture 700 includes one or more sensor units, such as a pedal sensor, a cadence sensor, and a torque sensor, among others. The electric motor 640, motor controller 642, battery 612, storage basket 618, and cockpit assembly 614 may be electronically coupled in many configurations. For example, the motor controller 642, battery 612, storage basket 618, and cockpit assembly 614 may be electronically coupled via one or more signal and/or power connections, such as one or more 12V power supply connections 702, one or more 60V bus connections 704, one or more 60V fused connections 706, or one or more controller area network (CAN) bus connections 708.

The cockpit assembly 614 may include a vehicle control module (VCU) 714, a camera 716, and a display 718. In some embodiments, the cockpit assembly 614 may include a backup battery 720 and a light ring 722. In some embodiments, the cockpit assembly 614 may include one or more other modules, such as a cellular module, an audio module, an NFC module, a brake lever module, a copilot module, and a navigation module, or any combination thereof.

The storage basket 618 may include a charging circuit 730, a pin lock 732, a head light 734, a recovery port 736, and a microcontroller 740, or any combination thereof. In this manner, the storage basket 618 may be referred to as a smart basket. The charging circuit 730 may be electronically coupled to a charging device, such as a docking station, to charge the battery 612 of the micromobility transit vehicle 600. The recovery port 736 may be a data connection, such as a USB connection, to one or more electrical components of the storage basket 618. The microcontroller 740 may be electronically coupled to one or more components or devices of the micromobility transit vehicle 600. For example, the microcontroller 740 may be electronically coupled to a battery lock 744, an immobilization lock 746, and a tail light 748 of the micromobility transit vehicle 600. The connection between the microcontroller 740 and each of the battery lock 744 and immobilization lock 746 may be a 12V switched power feedback connection. The connection between the microcontroller 740 and the tail light 748 may be a 12V pulse width modulation connection. In such embodiments, the microcontroller 740 may control operation of the battery lock 744, the immobilization lock 746, and the tail light 748. The battery lock 744 may selectively lock the battery 612, such as to prevent battery theft. The immobilization lock 746 may selectively lock the rear wheel 606, such as to prevent movement and/or theft of the micromobility transit vehicle 600.

Figure 9:
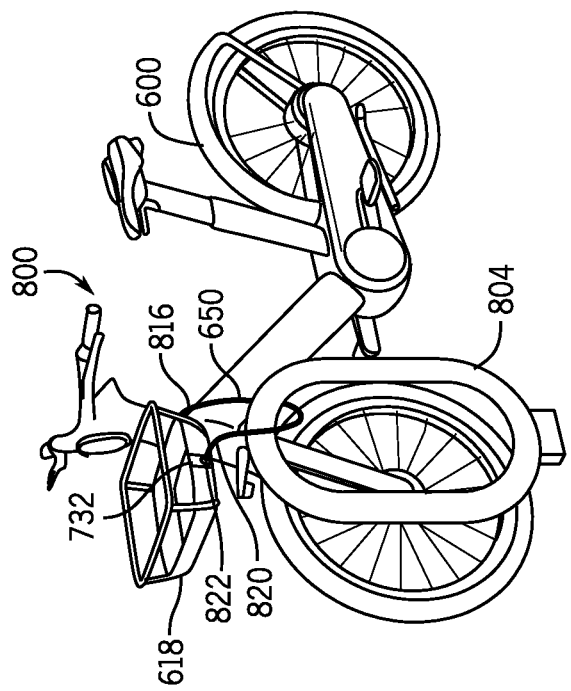
FIG. 9 illustrates a diagram of a micromobility transit vehicle secured to a street furniture via a locking assembly in accordance with an embodiment of the disclosure.
Figure 8:
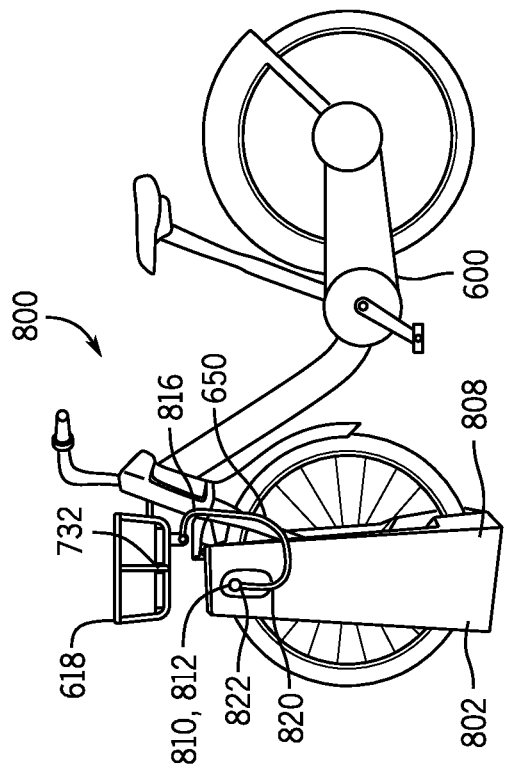
FIG. 8 illustrates a diagram of a micromobility transit vehicle secured to a docking station via a locking assembly in accordance with an embodiment of the disclosure.

FIG. 8 illustrates a diagram of the micromobility transit vehicle 600 secured to a docking station via a locking assembly in accordance with an embodiment of the disclosure. FIG. 9 illustrates a diagram of the micromobility transit vehicle 600 secured to a street furniture via a locking assembly in accordance with an embodiment of the disclosure. Referring to FIGS. 8-9, the micromobility transit vehicle 600 may include a locking assembly 800 operable to lock the micromobility transit vehicle 600 to a docking station 802 and/or street furniture 804. The docking station 802 may be similar to docking station 300 described above. For example, the docking station 802 may include one or more docks 808 each with a securement point 810 for receiving and locking the locking assembly 800 of the micromobility transit vehicle 600. The securement point 810 may be an active or passive lock. For instance, the securement point 810 may be defined as a pin latch 812 configured to receive and selectively lock to a pin of the locking assembly 800. In some embodiments, the securement point 810 may include a structure about which the locking assembly 800 is wrapped or a lock hole through which a portion of the locking assembly 800 is received to lock the micromobility transit vehicle 600 to the docking station 802.

As described herein, street furniture 804 refers to any stationary or moveable object or equipment installed along streets, sidewalks, roads, lots, or other areas accessible by a rider of the micromobility transit vehicle 600 for various purposes. Examples include bicycle racks, benches, bollards, streetlamps, signs, stands, lights, posts, or other stationary structure. In some embodiments, street furniture 804 may encompass docking station 802, or vice versa. For example, docking station 802 may also refer to any stationary or moveable object or equipment installed along streets, sidewalks, roads, lots, or other areas accessible by a rider of the micromobility transit vehicle 600 for docking the micromobility transit vehicle 600. Accordingly, docking station 802 may refer to street furniture 804, and street furniture 804 may refer to docking station 802. In such embodiments, the street furniture 804 may include securement point 810. As detailed below, the locking assembly 800 may be wrapped around, extended through, or otherwise connected to the street furniture 804 or docking station 802, such as via securement point 810, to secure the micromobility transit vehicle 600.

The locking assembly 800 may define a lock-to mechanism including the lock cable 650 and the pin lock 732 of the storage basket 618. In such embodiments, the lock cable 650 may be secured to the pin lock 732 to lock the micromobility transit vehicle 600 to the storage basket 618. As shown, the lock cable 650 may include a first end 816 and an opposing second end 820. The first end 816 may be coupled to (e.g., fixed to) the storage basket 618. For instance, the first end 816 may be fastened, welded, adhered, or otherwise secured to the storage basket 618 in a permanent or semi-permanent manner. The second end 820 may include a locking pin 822. Referring to FIG. 8, the locking pin 822 may be securable to the securement point 810 of the docking station 802 to lock the micromobility transit vehicle 600 to the docking station 802. For example, the pin latch 812 may be configured to secure the locking pin 822 of the lock cable 650. In some embodiments, the locking pin 822 may be inserted within the pin latch 812 of docking station 802, whereupon the pin latch 812 engages the locking pin 822. In some embodiments, the locking pin 822 and pin latch 812 may be similar to the corresponding structures described in U.S. Pat. No. 10,577,834 B1, entitled "SYSTEMS AND METHODS FOR MAGNET-EQUIPPED LOCKS," which is incorporated herein in its entirety for all purposes.

Although the locking assembly 800 is shown and described as being associated with the storage basket 618 on the front of the micromobility transit vehicle 600, it is contemplated that the locking assembly 800 may be associated with other elements of the micromobility transit vehicle 600, including rear portions of the micromobility transit vehicle 600. For example, the locking assembly 800 may be associated with a rear fender, rear chain stay, or other element in the rear of the micromobility transit vehicle 600. In such embodiments, the lock cable 650 may lock a rear of the micromobility transit vehicle 600 to the docking station 802 and/or street furniture 804, in a similar manner as described herein.

In some embodiments, the locking assembly 800 may be configured to provide a charging function to charge the micromobility transit vehicle 600 when the locking pin 822 is secured to the docking station 802. For example, the locking pin 822 may be configured to be inserted in the pin latch 812 to connect and/or establish an electrical connection between the docking station 802 and the micromobility transit vehicle 600 to charge the micromobility transit vehicle 600, where alternating current and/or direct current passes from the docking station 802 through the electrical connection to the inserted locking pin 822. In some embodiments, connection of the locking pin 822 with the pin latch 812 may electronically couple the charging circuit 730 of the basket module with a power source of the docking station 802 via the lock cable 650. In such embodiments, the charging circuit 730 may charge the battery 612 of the micromobility transit vehicle 600, such as a battery configured to provide electrical power to the electric motor 640. In this manner, the locking assembly 800 (e.g., the lock cable 650) may provide both a locking function to lock the micromobility transit vehicle 600 and a charging function to charge the micromobility transit vehicle 600. In some embodiments, connection of the lock cable 650 with the docking station 802 may provide signal communication between the docking station 802 and the micromobility transit vehicle 600. For example, the interface between the docking station 802 and the micromobility transit vehicle 600 via the lock cable 650 may provide a communication link for wake up, handshake, or other signals between the docking station 802 and the micromobility transit vehicle 600.

Referring to FIG. 9, the locking pin 822 may be securable to the pin lock 732 of the storage basket 618 to lock the micromobility transit vehicle 600 via the lock cable 650. For instance, the lock cable 650 may be wrapped around or inserted through a portion of the street furniture 804 and the locking pin 822 selectively secured to the pin lock 732 of the storage basket 618 to lock the micromobility transit vehicle 600. In this manner, the lock cable 650 may be selectively secured to a wide range of street furniture 804 to lock the micromobility transit vehicle 600 to the street furniture 804. Although street furniture 804 is shown in FIG. 9, the micromobility transit vehicle 600 may be secured to a docking station or other structure in a similar manner. For instance, the lock cable 650 may be inserted through a hole of a docking station or wrapped around a structure and the locking pin 822 selectively secured to the pin lock 732 of the storage basket 618 to lock the micromobility transit vehicle 600.

Depending on the application, the pin lock 732 of the storage basket 618 may be similar to the pin latch 812 of docking station 802. For example, the pin lock 732 of the storage basket 618 may engage the locking pin 822 when the locking pin 822 is inserted within the pin lock 732, such as in a manner similar to that described above or in U.S. Pat. No. 10,577,834 B1.

Figure 10:
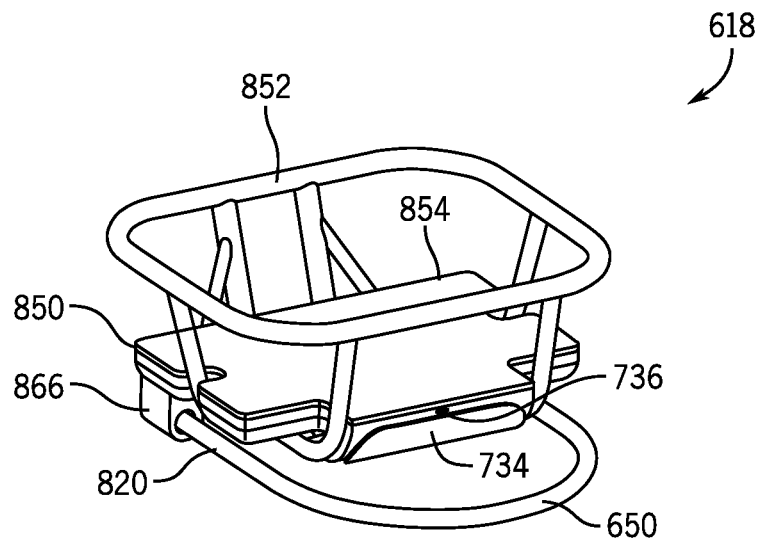
FIG. 10 illustrates a diagram of a top perspective view of a storage basket in accordance with an embodiment of the disclosure.
Figure 11:
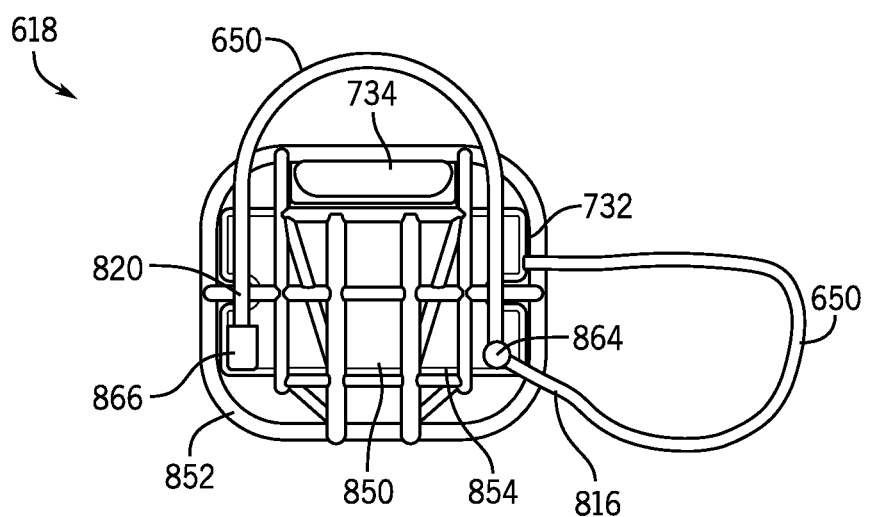
FIG. 11 illustrates a diagram of a bottom view of the storage basket of FIG. 10 and showing an underside of the storage basket in accordance with an embodiment of the disclosure.

FIG. 10 illustrates a diagram of a top perspective view of the storage basket 618 in accordance with an embodiment of the disclosure. FIG. 11 illustrates a diagram of a bottom view of the storage basket 618 of FIG. 10 and showing an underside of the storage basket 618 in accordance with an embodiment of the disclosure. Referring to FIGS. 10-11, the storage basket 618 may include a base 850 and a basket 852 extending from the base 850. In some embodiments, the base 850 may be defined as an enclosure 854, such that the enclosure 854 defines a bottom of the storage basket 618. The enclosure 854 may house one or more electronics or components, such as one or more electronics or components of the microcontroller 740, pin lock 732, head light 734, recovery port 736, or charging circuit 730. In some embodiments, the lock cable 650 may be secured to the enclosure 854. For example, the first end 816 of the lock cable 650 may be secured to the enclosure 854 and the second end 820 of the lock cable 650 may be releasably secured to the enclosure 854.

Referring to FIG. 11, the storage basket 618 may include a cable pivot 864 and a cable holster 866. The cable pivot 864 may connect the first end 816 of the lock cable 650 to the storage basket 618. For example, the cable pivot 864 may rotate about 120 degrees relative to the enclosure 854 to allow movement of the first end 816 of the lock cable 650 during locking of the micromobility transit vehicle 600. The cable holster 866 may releasably retain the second end 820 of the lock cable 650. For example, the cable holster 866 may releasably retain the locking pin 822 of the lock cable 650 when not locked to either the docking station 802 or to the pin lock 732. In such embodiments, the locking pin 822 may be removable from the pin lock 732 or the pin latch 812 and insertable in the cable holster 866 for storing the locking pin 822 when not in use. As shown, the cable pivot 864 and the cable holster 866 may be positioned on opposite sides of the enclosure 854, such that the lock cable 650 defines a loop when the second end 820 of the lock cable 650 is positioned within the cable holster 866. The pin lock 732 may be positioned on the same side of the storage basket 618 as the cable pivot 864.

Figure 12A:
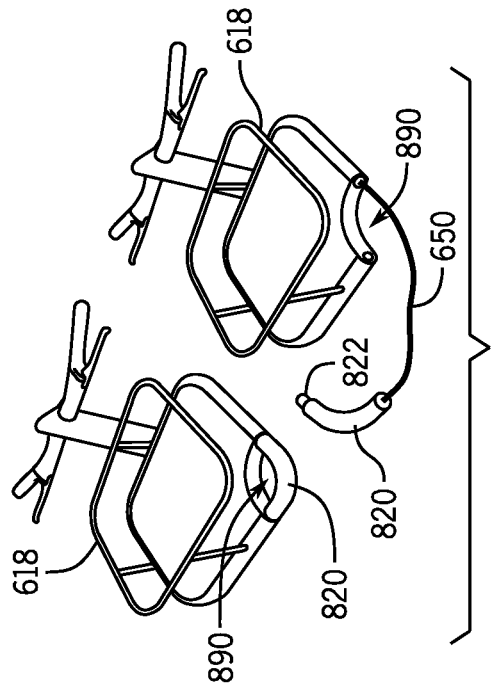
FIGS. 12A, 12B, 12C, and 12D illustrate respective diagrams of various alternative examples of the storage basket in accordance with an embodiment of the disclosure.

FIGS. 12A, 12B, 12C, and 12D illustrate respective diagrams of various alternative examples of the storage basket 618 in accordance with an embodiment of the disclosure. As shown, the lock cable 650 and the pin lock 732 may include many configurations. Referring to FIG. 12A, the lock cable 650 may be stored along or held within a rim 880 of the storage basket 618, such as when the locking pin 822 is not secured to the pin lock 732. In this manner, the lock cable 650 may live on the rim 880 when the lock cable 650 is not in use. The rim 880 may be defined on the base 850 of the storage basket 618, such as along the enclosure 854. For example, the rim 880 may extend around the base 850, such as along the left, front, and right sides of the base 850. In some embodiments, a groove 882 may extend along the rim 880 of the storage basket 618, the lock cable 650 receivable within the groove 882 to store the lock cable 650 when not in use.

The second end 820 (e.g., the locking pin 822) may be releasably retained on the rim 880. For example, the locking pin 822 may engage a clip, detent, or other structure. In some embodiments, the cable holster 866 may be defined on the rim 880 of the storage basket 618. In this manner, the lock cable 650 may be wrapped at least partially around the storage basket 618 and held in place when the locking pin 822 is not secured to the pin lock 732. When the lock cable 650 is to be used to lock the micromobility transit vehicle 600, the locking pin 822 may be removed from its storage position and the lock cable 650 unwrapped from the storage basket 618, such that the locking pin 822 may be secured to the securement point 810 of the docking station 802 or the pin lock 732 of the storage basket 618.

Figure 12B:
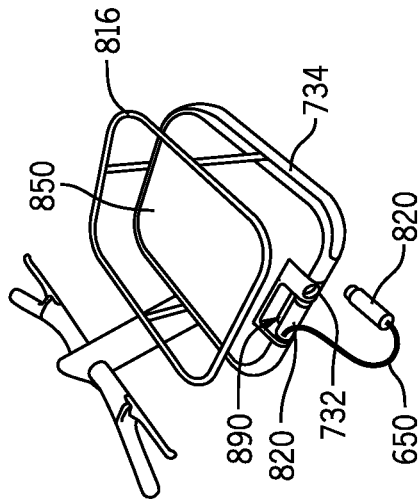

Referring to FIG. 12B, the second end 820 (e.g., the locking pin 822) may define at least a portion of the storage basket 618 when the locking pin 822 is not secured to the pin lock 732, such as when the lock cable 650 is in a storage position. For example, the second end 820 may define a side, a corner, or other portion of the base 850 of the storage basket 618. As shown, the base 850 may include a cutout 890 (e.g., along the side or at the corner of the base 850). The second end 820 may be configured to fit within the cutout 890 to store the locking pin 822 when not in use. When stored, the locking pin 822 may be inserted within the base 850 to locate the second end 820 within the cutout 890. As shown, the groove 882 may extend along the rim 880 of the base 850 up to the cutout 890. In such embodiments, the lock cable 650 may be received within the groove 882 when the second end 820 is positioned within the cutout 890. When the lock cable 650 is to be used to lock the micromobility transit vehicle 600, the second end 820 may be removed from the cutout 890, such that the locking pin 822 may be secured to the securement point 810 of the docking station 802 or the pin lock 732 of the storage basket 618. As shown, the pin lock 732 may be defined adjacent to the cutout 890, such as on a side of the cutout 890 opposite of the groove 882. Although the second end 820 is illustrated as defining a portion of the base 850 of the storage basket 618, in some embodiments, the second end 820 may define a portion of the basket 852 that extends from the base 850.

Figure 12C:
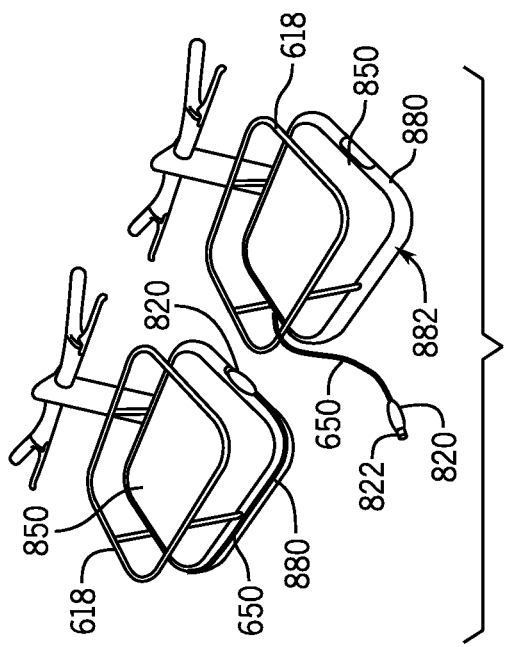

Referring to FIG. 12C, the lock cable 650 may be retractable at least partially within the storage basket 618 to store the lock cable 650 within the storage basket 618. The lock cable 650 may be retractably received within the storage basket 618 in many configurations. For instance, the storage basket 618 may include an internal channel or bore extending within and along the inner periphery of the base 850. In such embodiments, the lock cable 650 may be pulled out of the storage basket 618 when the lock cable 650 is to be used to lock the micromobility transit vehicle 600. To store the lock cable 650, the lock cable 650 may be retracted, such as automatically, within the storage basket 618 until the second end 820 of the lock cable 650 is received within the cutout 890. The lock cable 650 may be retractable within the storage basket 618 in many configurations. For example, the first end 816 of the lock cable 650 may be secured to a linear spring or the lock cable 650 may define a linear spring itself.

The storage basket 618 may include a ratchet mechanism, a pawl-like device, or other suitable component to allow extension of the lock cable 650 while also limiting undesired retraction of the lock cable 650 when locking the micromobility transit vehicle 600. In such embodiments, the ratchet mechanism (or other suitable device) may be selectively released to allow retraction of the lock cable 650. In some embodiments, the lock cable 650 may be retractably wound on a spooling device. The spooling device may be biased to retract the lock cable 650 and may include a ratchet mechanism built-in. As shown in FIG. 12C, the second end 820 of the lock cable 650 may include a shape complementary to the shape of the base 850. For example, the second end 820 may be curved to match the curvature of the base 850 at the corner.

Figure 12D:
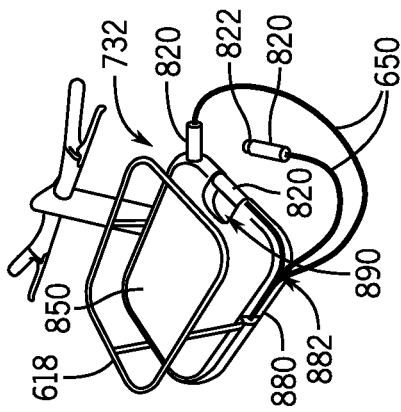

Referring to FIG. 12D, the second end 820 may be shaped to complement the curvature or linearity of the base 850 along its side. In such embodiments, the pin lock 732 may be positioned on the same side of the storage basket 618 as the cutout 890. As shown, the head light 734 may be defined in the base 850 of the storage basket 618, such as along a portion of the rim 880 of the base 850. The head light 734 may extend along the front of the base 850. In some embodiments, the head light 734 may wrap at least partially around the sides of the base 850 to provide a degree of peripheral or side-directed lighting. The head light 734 may be an LED array or other suitable lighting assembly.

FIGS. 13A, 13B, and 13C illustrate respective diagrams of various use case examples of the locking assembly 800 in accordance with an embodiment of the disclosure. Referring to FIG. 13A, the locking assembly 800 may be implemented on the storage basket 618 associated with various types of micromobility transit vehicles (e.g., micromobility transit vehicle 600, micromobility transit vehicle 110*c*, etc.). As shown, the locking assembly 800 may be used to lock the micromobility transit vehicle to street furniture 804, such as a bicycle rack as shown although other configurations are contemplated. To lock the micromobility transit vehicle to the street furniture 804, the lock cable 650 may be wrapped around the street furniture 804 and the second end 820 of the lock cable 650 secured to the pin lock 732 of the storage basket 618.

Referring to FIG. 13B, the locking assembly 800 may be used to lock a micromobility transit vehicle (e.g., micromobility transit vehicle 600, micromobility transit vehicle 110*c*, etc.) to a docking station 900. The docking station 900 may be similar to docking station 802 described above. For example, the docking station 900 may include a lock hole 902, such as defined through a plate of the docking station 900. To lock the micromobility transit vehicle to the docking station 900, the lock cable 650 may be extended through the lock hole 902 to wrap the lock cable 650 around the docking station 900, and the second end 820 of the lock cable 650 secured to the pin lock 732 of the storage basket 618.

Referring to FIG. 13C, the pin lock 732 may be configured to engage a locking device separate from the locking pin 822 of the lock cable 650. For example, a docking station 910 may include a cable 912 similar to the lock cable 650. The cable 912 of the docking station 910 may be secured to the pin lock 732 of the storage basket 618 to lock a micromobility transit vehicle (e.g., micromobility transit vehicle 600, micromobility transit vehicle 110*c*, etc.) to the docking station 910. In such embodiments, the charging circuit 730 may be associated with both the lock cable 650 and the pin lock 732, such that connection of the lock cable 650 to docking station 802 or connection of the cable 912 with the pin lock 732 charges the battery 612 of the micromobility transit vehicle.

Figure 14:
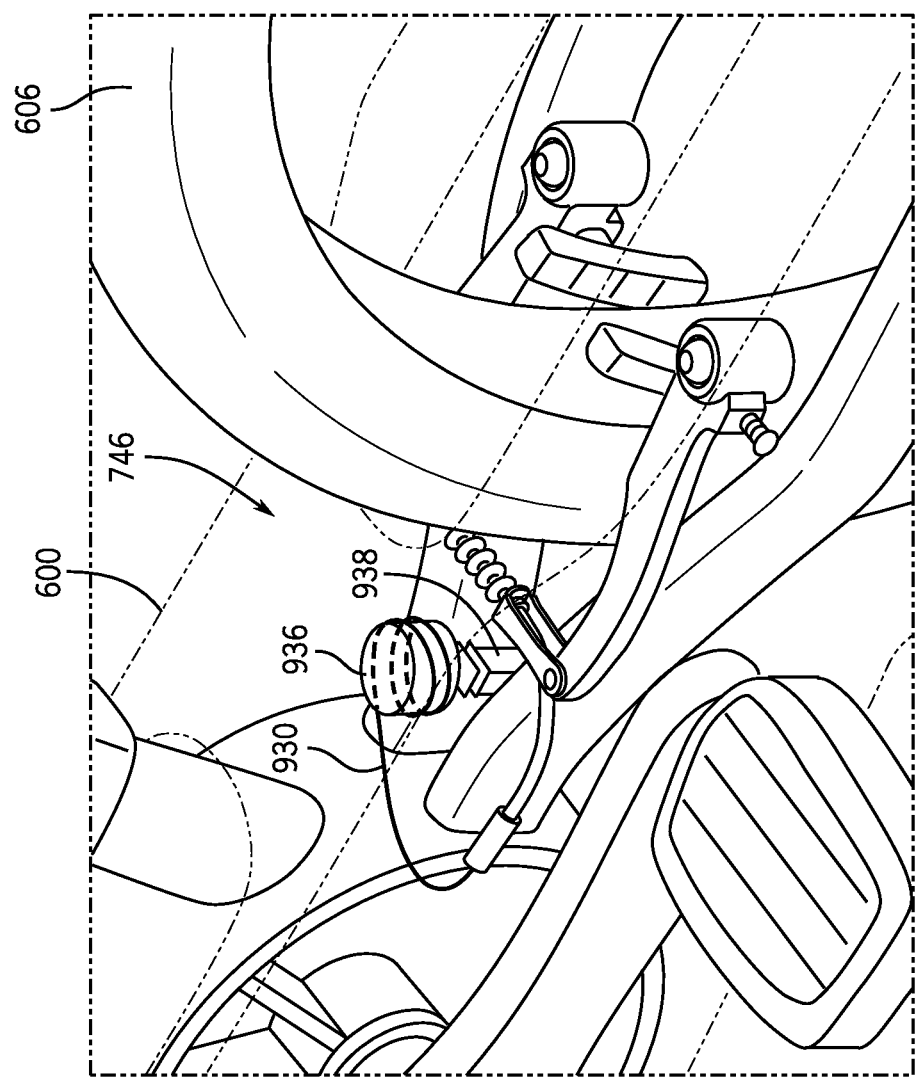
FIG. 14 illustrates a diagram of a first immobilization lock in accordance with an embodiment of the disclosure.
Figure 15:
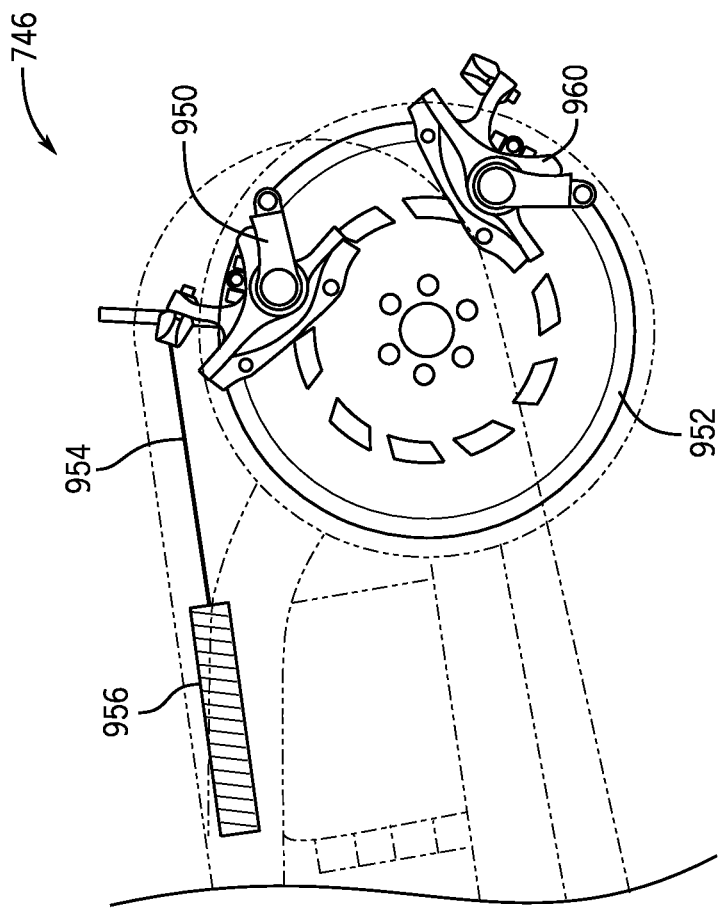
FIG. 15 illustrates a diagram of a second immobilization lock in accordance with an embodiment of the disclosure.

FIG. 14 illustrates a diagram of a first immobilization lock 746 in accordance with an embodiment of the disclosure. FIG. 15 illustrates a diagram of a second immobilization lock 746 in accordance with an embodiment of the disclosure. Referring to FIGS. 14-15, the immobilization lock 746 may include many configurations to immobilize micromobility transit vehicle 600. For example, the immobilization lock 746 may be implemented as a wheel lock configured to immobilize the rear wheel 606 of micromobility transit vehicle 600. The immobilization lock 746 may be activated to limit use of the micromobility transit vehicle 600, such as to limit theft of the micromobility transit vehicle 600, limit nonpaying use of the micromobility transit vehicle 600, or the like. Similar to security device 144, the immobilization lock 746 may immobilize the micromobility transit vehicle 600 until management system 240 transmits an unlock signal to the micromobility transit vehicle 600. The immobilization lock 746 may be hidden, such as concealed within a chain stay housing, to limit tampering of the immobilization lock 746.

The immobilization lock 746 may be smart controlled. For example, the immobilization lock 746 may be activated based on a detected condition of the micromobility transit vehicle 600. The detected condition may be a detected theft, a detected vandalism, a detected misuse, or the like. In some embodiments, the detected condition may correspond to a safety condition of the micromobility transit vehicle 600. For example, a controller may determine whether the micromobility transit vehicle 600 is being operated in an unsafe condition, such as at excessive speeds, on unsafe terrain, in unsafe conditions, or in any other unsafe manner. In some embodiments, a controller may determine whether the lock cable 650 is properly stored. For example, image data from an onboard camera, such as camera 148 described above, may be analyzed to determine whether the lock cable is properly stored in or on the storage basket 618. In some embodiments, the micromobility transit vehicle 600 may include one or more sensors configured to detect whether the lock cable 650 is in a stored position.

In some embodiments, image data from the onboard camera (e.g., camera 148) may be used to detect additional conditions of the micromobility transit vehicle 600. For example, and without limitation, an end-of-ride image may be taken by the onboard camera when the micromobility transit vehicle 600 is parked or locked to determine where the micromobility transit vehicle 600 is located. For instance, the end-of-ride image taken by the onboard camera may be analyzed to determine whether the micromobility transit vehicle 600 is parked/locked indoors or outdoors, on private property or public property, or the like. In some embodiments, the image data may be used with GPS data, such as from GNSS receiver 118, to improve locating the micromobility transit vehicle 600 (e.g., for asset recovery, navigation, latitude/longitude coordinate reporting, etc.). In some embodiments, the image data may be used to detect vandalism or theft of the micromobility transit vehicle 600. The image data may be gathered by the onboard camera automatically at end-of-ride, automatically based on a detected condition of the micromobility transit vehicle 600 (e.g., before battery depletion, before system failure, when vandalism or theft is detected, etc.), or on demand, such as at the request of management system 240.

In some embodiments, the image data may be used to determine one or more conditions for asset recovery operations. For example, knowing whether the micromobility transit vehicle 600 is indoors or outdoors, on private property or public property, being vandalized or stolen, or the like may improve asset recovery, determine a likelihood of success for asset recovery, reduce costs associated with attempting to recover an unrecoverable asset, and aid in determining or estimating operational losses, etc.

When these or other conditions of the micromobility transit vehicle 600 are detected, the immobilization lock 746 may be activated to limit or prevent additional action or use of the micromobility transit vehicle 600. For example, if the lock cable 650 is not properly stored, the immobilization lock 746 may be activated to limit or prevent use of the micromobility transit vehicle 600 until the lock cable 650 is properly stored. If the micromobility transit vehicle 600 is being operated in an unsafe manner, the immobilization lock 746 may be activated to reduce or alleviate the detected safety concern(s), such as reducing the speed of the micromobility transit vehicle 600 based on conditions or local regulations. If the micromobility transit vehicle 600 is being stolen or vandalized, the immobilization lock 746 may be activated to prevent use of the micromobility transit vehicle 600 or at least act as a deterrent against further loss or vandalism.

In some embodiments, the immobilization lock 746 may be remotely actuated, such as by management system 240. For example, the management system 240 may remotely lock the micromobility transit vehicle 600 through remote activation of the immobilization lock 746 based on a detected condition or as desired to protect the micromobility transit vehicle 600. For example, after analyzing the image data from the onboard camera, the management system 240 may remotely activate the immobilization lock 746 based on a detected condition (e.g., parked/locked on private property, parked/locked indoors, during vandalism/theft of the micromobility transit vehicle 600, etc.). In some embodiments, the immobilization lock 746 may provide backup braking or braking assistance, such as if the primary braking system fails, if the primary braking system is inadequate, or if the rider fails to activate the primary braking system (e.g., crash avoidance). The braking provided by the immobilization lock 746 may be gradual to safely slow the micromobility transit vehicle 600.

Referring to FIG. 14, the immobilization lock 746 may be implemented as a rim brake associated with the rear wheel 606. The rim brake may be actuated by a brake cable 930 connected to a spooling device. The spooling device may include a spool 936 coupled to the brake cable 930 and a motor 938 coupled to the spool 936. When immobilization of the rear wheel 606 is desired, the motor 938 may be actuated to rotate the spool 936. Rotation of the spool 936 may tighten the brake cable 930 to clamp the rim brake against the rim of the rear wheel 606. The rear wheel 606 may be unlocked by deactivating the motor 938 (or reversing the motor 938) to release the tension in the brake cable 930, thereby allowing the rim brake to disengage the rim of the rear wheel 606.

Referring to FIG. 15, the immobilization lock 746 may be implemented as a brake caliper 950 associated with a brake rotor 952 of the rear wheel 606. The brake caliper 950 may be actuated by a brake cable 954 connected to an actuator 956. The actuator 956 may be motor driven, worm gear actuated, or solenoid actuated (e.g., magnetic latching solenoid), among others. For example, the actuator 956 may be an electro-mechanical linear actuator, a door lock actuator, or the like. When immobilization of the rear wheel 606 is desired, the actuator 956 may be actuated to tension the brake cable 954. Increased tension in the brake cable 954 may actuate the brake caliper 950 to clamp the brake rotor 952. The rear wheel 606 may be unlocked by deactivating the actuator 956 (or reversing the actuator 956) to release the tension in the brake cable 954, thereby allowing the brake caliper 950 to disengage the brake rotor 952 of the rear wheel 606. As shown, the immobilization lock 746 may be a braking device separate from a main braking component of the micromobility transit vehicle 600. For instance, the micromobility transit vehicle 600 may include a main brake caliper 960 actuated by a rider via one or more brake levers. Each of the brake caliper 950 of the immobilization lock 746 and the main brake caliper 960 may be associated with the same brake rotor 952 of the micromobility transit vehicle's braking system.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A station for securing micromobility vehicles, the station comprising:
   a first locking and charging mechanism capable of docking and charging a first type of micromobility vehicle;
   a second locking and charging mechanism capable of locking and charging a second type of micromobility vehicle that is not compatible to lock and charge with the first locking and charging mechanism of the station, wherein the first locking and charging mechanism and the second locking and charging mechanism are associated with the same station, and wherein the second locking and charging mechanism comprises:
   a securement point capable of securing the second type of micromobility vehicle to the station; and
   an electrical connection cable, wherein the electrical connection cable has a first end fixed to the station and a second end corresponding to an electrical connection port securable to an electrical receiving point of the second type of micromobility vehicle; and
   a network communicator for communicating with a micromobility vehicle management system that manages a plurality of stations including the station, wherein the network communicator is capable of transmitting battery status of one or more of the first type of micromobility vehicle or the second type of micromobility vehicle to the micromobility vehicle management system.

2. The station of claim 1, wherein:
the electrical connection port establishes an electrical connection between the station and the second type of micromobility vehicle for charging a battery of the second type of micromobility vehicle based on the battery status of the second type of micromobility vehicle; and
the electrical connection between the station and the second type of micromobility vehicle couples the battery of the second type of micromobility vehicle with a power source of the station through the electrical connection port.

3. The station of claim 1, wherein:
the electrical connection port comprises a powered receptacle to receive a docking mechanism of the second type of micromobility vehicle.

4. The station of claim 1, further comprising:
one or more displays associated with one or more user interfaces of the micromobility vehicle management system configured to render an indication of the battery status.

5. The station of claim 1, further comprising:
an interface between the station and the second type of micromobility vehicle through an electrical connection between the station and the second type of micromobility vehicle, wherein the interface provides a communication link to perform at least a handshake between the station and the second type of micromobility vehicle to determine that the electrical connection is trustworthy.

6. The station of claim 1, wherein the securement point is configured to be secured to by a locking mechanism of the second type of micromobility vehicle.

7. The station of claim 6, wherein the securement point is a lock hole or a loop in a structure of the station.

8. The station of claim 1, wherein the electrical connection port provides a communication link between the station and the second type of micromobility vehicle.

9. A station for securing micromobility vehicles, the station comprising:
a first locking and charging mechanism capable of docking and charging a first type of micromobility vehicle; and
a second locking and charging mechanism capable of locking and charging a second type of micromobility vehicle that is not compatible to lock and charge with the first locking and charging mechanism of the station, wherein the first locking and charging mechanism and the second locking and charging mechanism are associated with the same station, and wherein the second locking and charging mechanism comprises:
a securement point capable of securing the second type of micromobility vehicle to the station; and
an electrical connection cable having a first end fixed to the station and a second end corresponding to an electrical connection port securable to an electrical receiving point of the second type of micromobility vehicle and capable of (i) establishing an electrical connection between the station and the second type of micromobility vehicle for charging a battery of the second type of micromobility vehicle, and (ii) provide a communication link between the station and the second type of micromobility vehicle.

10. The station of claim 9, wherein:
the electrical connection between the station and the second type of micromobility vehicle couples the battery of the second type of micromobility vehicle with a power source of the station through the electrical connection cable.

11. The station of claim 9, wherein:
the securement point comprises a powered receptacle to receive the electrical connection cable.

12. The station of claim 9, further comprising:
one or more displays associated with one or more user interfaces of a management system configured to render an indication of a battery status of one or more of the first type of micromobility vehicle or the second type of micromobility vehicle.

13. The station of claim 9, further comprising:
an interface between the station and the second type of micromobility vehicle through the electrical connection cable, wherein the interface provides the communication link to perform at least handshake between the station and the second type of micromobility vehicle to determine that the electrical connection is trustworthy.

14. The station of claim 9, further comprising:
a network connector in communication with a management system, wherein the network connector is capable of transmitting battery information associated with one or more of the first type of micromobility vehicle or the second type of micromobility vehicle to the management system.

15. A system for managing a plurality of stations, comprising:
a management system in communication with the plurality of stations;
a station of the plurality of stations comprising:
a first locking and charging mechanism capable of docking and charging a first type of micromobility vehicle;
a second locking and charging mechanism capable of locking and charging a second type of micromobility vehicle that is not compatible to lock and charge with the first locking and charging mechanism of the station, wherein the first locking and charging mechanism and the second locking and charging mechanism are associated with the same station, and wherein the second locking and charging mechanism comprises:
a securement point capable of securing the second type of micromobility vehicle to the station; and
an electrical connection cable, wherein the electrical connection cable has a first end fixed to the station and a second end corresponding to an electrical connection port securable to an electrical receiving point of the second type of micromobility vehicle; and
a network communicator for communicating with the management system that manages a plurality of micromobility vehicles and the plurality of stations including the station;
wherein the network communicator is capable of transmitting battery status of one or more of the first type of micromobility vehicle or the second type of micromobility vehicle to the management system.

16. The system of claim 15, wherein:
the electrical connection port establishes an electrical connection between the station and the second type of micromobility vehicle for charging a battery of the second type of micromobility vehicle based on the battery status of the second type of micromobility vehicle; and the electrical connection between the station and the second type of micromobility vehicle couples the battery of the second type of micromobility vehicle with a power source of the station through the electrical connection port.

17. The system of claim 15, wherein:

the electrical connection port comprises a powered receptacle to receive a docking mechanism of the second type of micromobility vehicle.

18. The system of claim 15, further comprising:

one or more displays associated with one or more user interfaces of the management system configured to render an indication of the battery status.

19. The system of claim 18, wherein the indication comprises one or more of:

a charge percentage;

a low charge indicator; or a full charge indicator.

20. The system of claim 15, further comprising:

an interface between the station and the second type of micromobility vehicle through an electrical connection between the station and the second type of micromobility vehicle, wherein the interface provides a communication link to perform at least handshake between the station and the second type of micromobility vehicle to determine that the electrical connection is trustworthy.

* * * * *